Nov. 27, 1962 C. L. HARE 3,066,190

ATTACHMENT FOR DIAL TELEPHONE SETS

Filed April 25, 1960 3 Sheets-Sheet 1

INVENTOR

CHARLES L. HARE

BY Jessley Everett

ATTORNEY

Nov. 27, 1962 C. L. HARE 3,066,190

ATTACHMENT FOR DIAL TELEPHONE SETS

Filed April 25, 1960 3 Sheets-Sheet 2

INVENTOR
CHARLES L. HARE

BY Jewesley Everett

ATTORNEY

Nov. 27, 1962 C. L. HARE 3,066,190

ATTACHMENT FOR DIAL TELEPHONE SETS

Filed April 25, 1960 3 Sheets-Sheet 3

INVENTOR
CHARLES L. HARE

BY Jewelry Everett
ATTORNEY 3,066,190

ATTACHMENT FOR DIAL TELEPHONE SETS

Charles L. Hare, % Roy's Auto Service, 3023 Hamilton Ave., Baltimore 14, Md.

Filed Apr. 25, 1960, Ser. No. 24,417
3 Claims. (Cl. 179—6.3)

The present invention relates to a coin control attachment for dial telephone sets.

The attachment according to the invention requires no modification of the telephone set, it being only necessary to attach to the dial a simple stop element which operates in conjunction with the attachment for locking the dial.

One object of the invention is the provision of a manually operated device which when used in combination with a proper coin, or coins will operate to unlock the telephone dial in order that the telephone may be used.

Another object of the invention is the provision of a simple mechanical means for returning the coin to the user when the sound transmitting element is replaced on its support.

Another object of the invention is the provision of a mechanical timing element to give the user a definite time in which to place a call. If the user does not get his party the money deposited in the attachment is returned to the user, provided the sound transmitting element is returned to its support.

A further object of the invention is the provision of a locking means that will prevent the operation of the coin operating member unless the proper coin, or coins have been deposited therein.

While several objects of the invention have been pointed out, other objects, uses and advantages will become more apparent as the nature of the invention is more fully disclosed, which includes its specific structure, combination and arrangement of its several parts as illustrated in the accompanying drawing and particularly pointed out in the detailed description to follow.

In the drawings.

In describing the invention like reference numerals are used to point out like and similar parts throughout the several views.

Figures 1, 2, 3, 4:
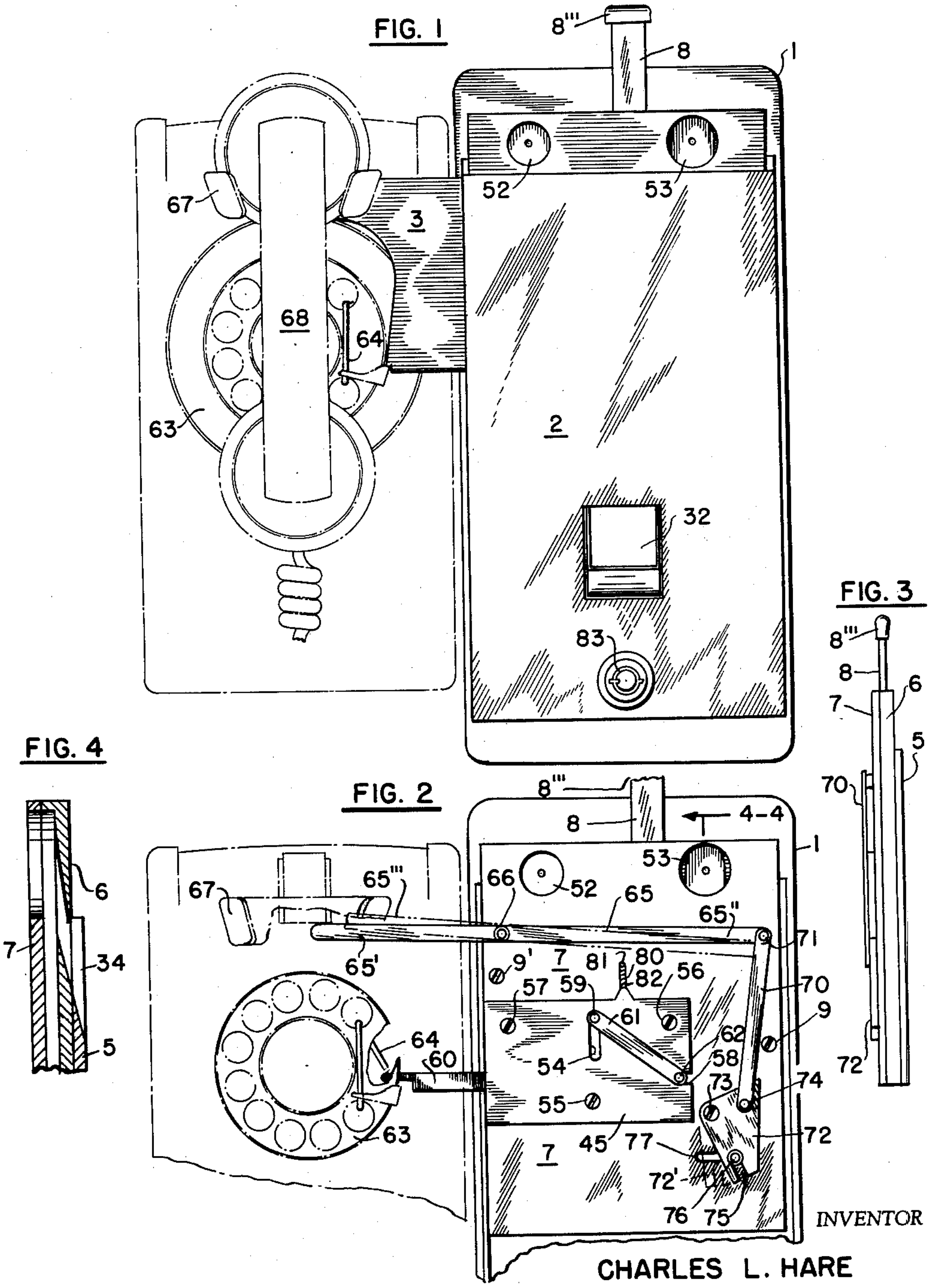
FIGURE 1 is a view in elevation of a telephone unit and the attachment as they would appear installed and ready for use.
FIGURE 2 is a fragmentary view in elevation of the telephone unit and the attachment in which the outer cover of the attachment has been removed, showing the dial locking means and the operating means connected with the sound transmitting support for returning the coin, or coins to the user.
FIGURE 3 is a side view in elevation of the attachment, showing the frame of the attachment made up of these super-imposed plates.
FIGURE 4 is a sectional view on line 4—4 of FIGURE 2.

Referring to the drawings, the numeral 1 indicates the rear housing for the attachment and numeral 2 indicates an outer housing cover. The cover has an extension 3 to one side to cover the operatable members of the attachment for locking the dial and the means for operating the coin return mechanism which will be described more in detail later on.

Within the rear housing and cover the mechanism is supported within and upon frame supports comprising three super-imposed plates, 5, 6 and 7 fastened together with suitable screws 9 and 9′. The center plate 6 is the thicker of the plates and contains the channels for accommodating the coins and the coin operating member 8 which is slidable within its particular channel to move the coins into the mechanism for unlocking the telephone dial, which is done by applying pressure on the outer end 8‴ of the coin operating member 8. The opposite side 6′ of the plate 6 is also provided with a recess 6″. Within this recess there is a plate member 10, which is movable vertically in the recess 6″. The plate 6 is further provided with a slot 11 through which an operating pin 12 carried by the coin operating member 8 extends to move and set the timing mechanism when the member 8 is depressed to move the coins beyond their initial position. The surface 6″ of plate 6 is also provided with a horizontal recess 13 and is separated from the recess 6″ by the rigid portion 19 for accommodating a horizontal shiftable plate 14. The plate 6 is further provided with vertical slots 15, 16, 17 and 18 for slidably accommodating pins 20, 21, 22 and 23 which are fixedly carried on the plate member 10 and extend through into the coin channels to form stops and means to regulate the progress and direction of the coins in the channels. The channels for the coins are designated by the numerals 24 and 25, the channel 24 being for dimes and the channel 25 being for nickels. It will be noted that each telephone call will require ten cents, which will have to be inserted into the mechanism before the unlocking elements will release the dial for operation. The mechanism is so designed as to be operated by a single dime or two nickels. The plate 6 is also provided with two horizontal slots 26 and 27 to slidably accommodate pins 30 and 31 which extend into the coin channels to regulate the progress and direction of the coins. It will be noted that all of the slots 15 to 23 and slots 26 to 27 are located in one or the other of the coin channels 24 and 25 for regulating the passage of the coins through the particular channels. Each of the coin channels 24 and 25 is provided with two outlets adjacent its bottom designated by numerals 24′ and 24″ and 25′ and 25″ respectively. The angled channels 24″ and 25″ are for returning the coins to the center of the cover and out the opening 32 to the user in case the receiver is hung up before a stipulated time, such as, when a call is not completed or busy signal is encountered. The vertical channels 24' and 25' are for directing the coins into a container within the housing when a call has been completed, or the time allotted for getting the party has expired. The channels 24'' and 25'' as mentioned before leading to the return opening 32 within the cover, are for returning the coins used in operating the attachment, if the user acts within the pre-set time period. When the coins are returned to the user the dial is locked.

Figure 7:
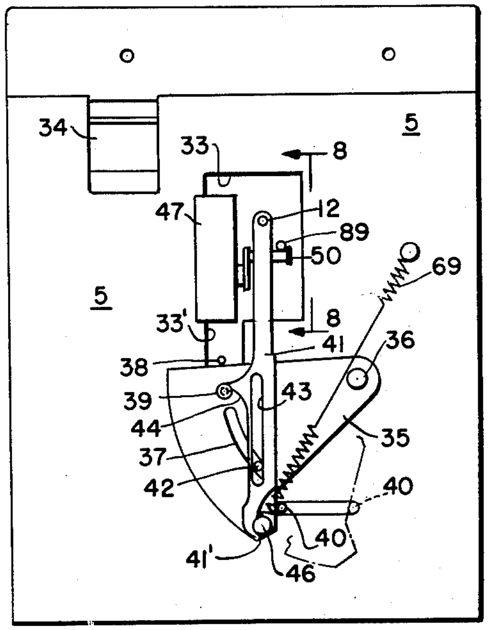
FIGURE 7 is a view in elevation of the back of the attachment frame when the plates are assembled showing the mechanical timing unit and its relative location on the attachment.

Over the back of the center plate 6 is the plate 5 (see FIGURE 7), and in this plate there is a relatively large opening 33 adjacent its center having a downwardly extended portion 33'. The plate is also provided with an opening 34 opposite the top of the nickel channel 25 through which pennies will drop into the money container without going through the nickel channel. The back plate 5 is also provided with a member 35 pivotally mounted on the outside surface by the pin 36 (see FIG. 7). The movement of this member 35 is limited by the pin 42 carried by the plate 5 which operated within the slot 37 in the member 35. The member 35 is operated in its limited arc by the pin 38 carried on the vertical sliding plate 10. The pin 38 is operated through the extended slotted area 33' in the plate 5 to move the horizontal plate 14 by contacting the pin 40 carried on one end of the member 14. It will be noted that the horizontal plate 14 has extending outwardly from its opposite side pins 30 and 31 for controlling, or blocking the coins from the return channels 24'' and 25'' during the dialing operation where they will remain unless they are moved out of the channels by returning the sound transmitting and receiving unit to its support. Working in conjunction with the pivoted plate 35 is a bar 41. This bar works beyond the outer rear surface of the frame plate 5 and is connected with the pin 12 carried by the coin operating member 8, which is also used to set the timing element 47. The bar 41 is provided with a slot 43 which rides over the pin 42 carries by the plate 5 to keep it in line. The bar 41 is also provided with an off-set 44 adapted to engage a pin 39 carried by the member 35 and its bottom end 41' is adapted to engage a second pin 46 also carried by the pivoted member 35. This bar 41 prevents the member 8 from being depressed unless there is either a dime, or two nickels in one or the other of the coin channels. The coins must be deposited in the coin channels before the member 35 can be moved by the pin 38 carried on the vertically movable plate 10 as previously referred to.

Figures 8, 9:
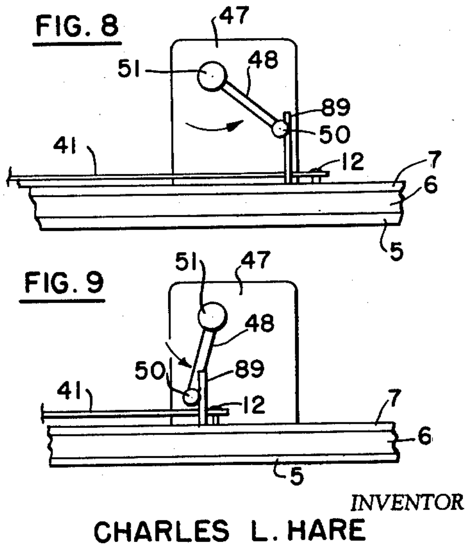
FIGURE 8 is a fragmentary sectional view of line 8—8 of FIGURE 7 showing a side view of the mechanical timing unit in normal position.
FIGURE 9 is a fragmentary sectional view similar to that shown in FIGURE 8 when the timing unit is set for the designated timing period.

Also carried on the rear plate 5 is a conventional timing unit 47 having an arm 48 and a handle portion 50, extending perpendicularly thereto adjacent its movable end. This arm 48 is adapted to swing around axis 51 and is under spring tension in the direction of the arrow as shown in FIGURES 8 and 9. The arm 48 of the timer is moved against the spring tension of the arm which will be locked in position for any set time for release. When the arm is released it moves in the direction of the arrow, as previously stated contacting the pin 89 which is fixed to the plate 10 moving the plate 10 upwardly within the recess 6'' together with the pins 20 and 23 releasing the coins so they may move down the coin channels 24' and 25' into the coin box.

Referring to the front face plate 7, this plate is provided with two openings 52 and 53 for receiving the coins, 52 being for dimes and 53 for nickels. This face plate 7 has a member 45 secured to its outer surface by the screws 55, 56 and 57 and is provided with a vertical slot 54 and a horizontal slot 58. The slot 54 is adapted to slidably accommodate a pin 59 carried on the plate 10. The outer end of the pin 59 is connected to one end of a link member 61 and the other end of the link member is connected to the outer end of the dial locking bar 60 by means of pin 62. The bar 60 is slidable horizontally through the slot 58 in the member 45. By moving the plate 10 and the pin 59 vertically within the slot 54, the bar 60 is moved horizontally into, or out of engagement with means carried by the telephone dial 63 for locking the dial in place and against rotation. The dial has secured thereto a clip member 64 which extends beneath the dial to form the means for engaging the outer end of the arm 60 when the arm is extended, as shown in FIGURE 2. But the dial may be provided with any other type of clip, or even a special dial may by substituted having means for engaging the dial locking bar 60 and substituted for the conventional type dial.

Figures 10, 12:
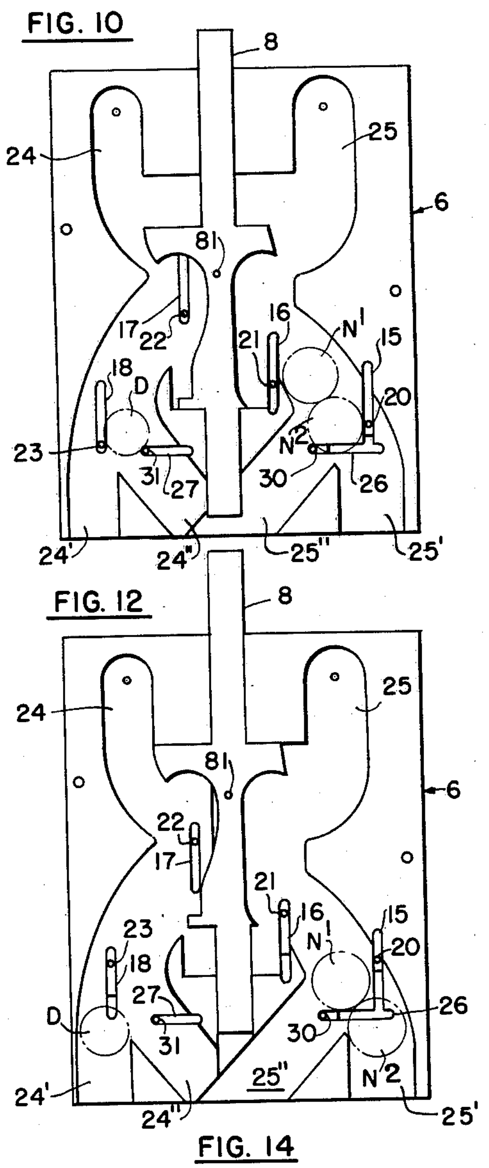
FIGURE 10 is a view in elevation of the same plate as that shown in FIGURE 5 in which the coins have been moved to a second location in the coin channels.
FIGURE 12 is a view in elevation of the same plate as that shown in FIGURES 5 and 10 in which the coins have been released to travel through the coin channels to the coin collecting box contained within the attachment.
Figure 11:
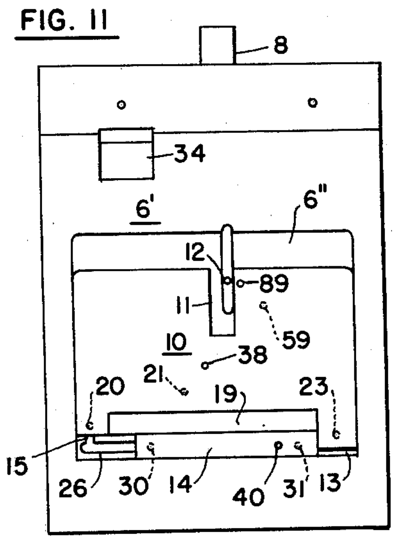
FIGURE 11 is a view in elevation of the rear surface of the plate shown in FIGURE 10.
Figure 13:
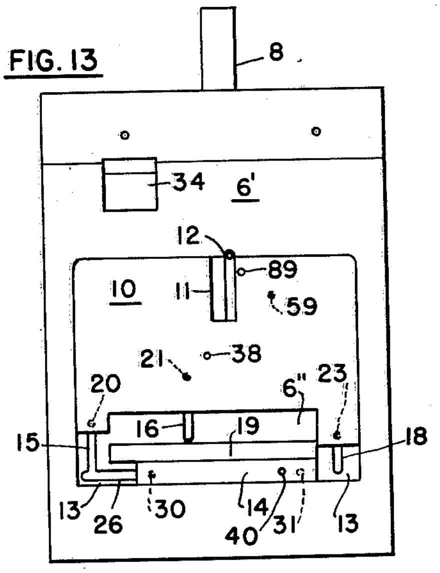
FIGURE 13 is a view in elevation of the rear surface of the plate shown in FIGURE 12.
Figure 14:
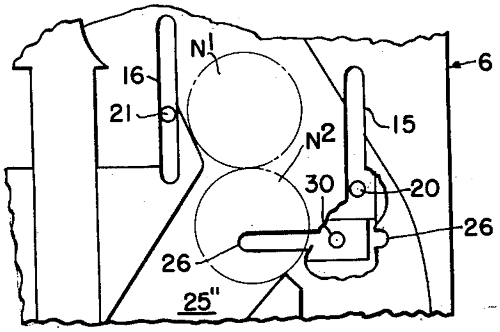
FIGURE 14 is an enlarged fragmentary view of the right hand corner of the plate shown in FIGURE 12 in which the coin is directed through an alternate coin channel to be returned to the user.

In order that the money deposited in the device may be returned to the user in case the user does not get his party within the time allowed, there is provided an arm 65 (see FIG. 2) pivoted about a pin 66 secured to the outer plate 7. The end 65' of the arm is located just below the movable sound transmitter unit support 67 and is adapted to be moved downwardly when the sound transmitting and receiving piece 68 of the telephone is resting on the support. The opposite end 65'' of the arm 65 is hingedly connected with one end of a link member 70 by the pin 71, the opposite end of the link member 70 being connected to a pivoted plate 72. This plate 72 is pivotally mounted on the outer surface of plate 7 by the screw 73. Spaced outwardly from the screw 73 is pin 74 hingedly connecting the opposite end of the link 70 with the member 72. The member 72 is further provided with a slot 75 positioned outwardly from the pivot 73 and at an angle to a line running through the pivot 73 and the pin 74. The slot 75 is adapted to slidably accommodate a pin 76 which is fixed to the horizontal movable plate 14 extending through the slot 77 in the face plate 7 of the frame. When the arm 65 is in the position as shown in dotted lines at 65''' in FIGURE 2, the member 72 is in the position as shown in dotted line 72' moving the horizontal plate 14 by means of the pin 76 which is carried by the plate 14 to a position where the pins 31 and 32 carried by the member 14 are in the position as shown in FIGURES 10 and 12, blocking the passage of the coins from entering the coin recesses 24'' and 25'' leading to the coin return opening 32 in the cover 2. When the arm 65 is moved down, as shown in full lines in FIGURE 2, the member 14 is moved horizontally together with the pins 31 and 32 to the opposite ends of the respective slots 26 and 27 allowing the coins to return to the user through recesses 24'' and 25'', provided, the sound transmitter unit is placed on the support 67 moving it to the downward position before the timer has operated to allow the coins to be deposited in the money box inside the housing by moving the pins 20 and 23 upwardly in the slots 15 and 18.

The coin operating means 8 is normally in an upwardly extended position and is depressable against a compression spring 80. The upper end of the spring is engaged by a pin 81 carried on the member 8 and the bottom of the spring is supported on the bottom of a slot 82 within the plate 7.

The attachment is installed on a base at the right of the wall telephone with its dial locking arm 60 positioned to engage the clip 64 attached to the dial, and its arm 65 positioned beneath the sound transmitter unit support 67.

The coin box is preferably secured to the inner face of the cover 2 (not shown) but may also be a separate box is preferred. The cover is held to the rear and side housing by a lock 83. The portion 3 carried by the cover is for concealing and to prevent tampering with the control arms 60 and 65.

Figure 5:
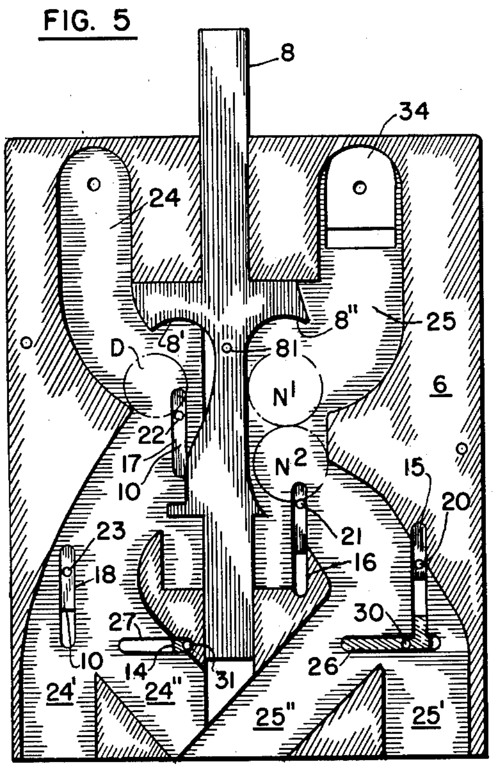
FIGURE 5 is a view in elevation of the front face of the plate member 6 having one of its super-imposed plates removed and showing the position of the coins in the coin channels when the coins are initially dropped into the attachment.
Figure 6:
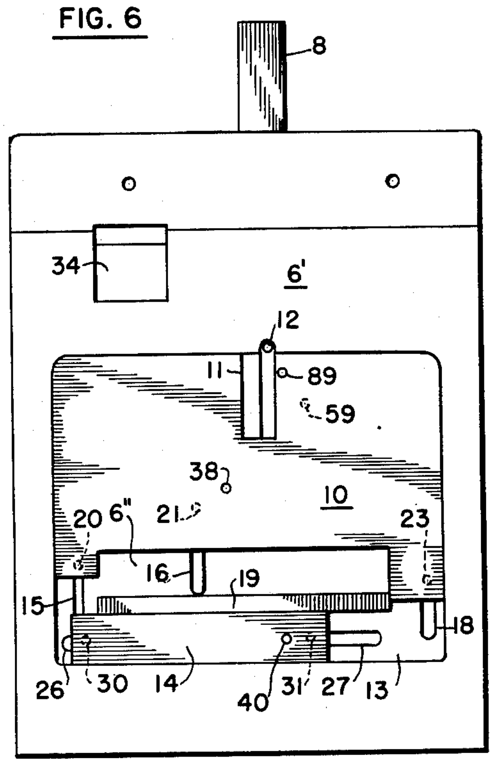
FIGURE 6 is the reverse side of the members 6 shown in FIGURE 5.

In use, after the attachment is in place, as shown in FIGURE 1, the sound transmitting member 68 is raised from the support 67. This allows the arm 65 to be moved upwardly as shown in dotted lines at 65''' in FIGURE 2 and will allow the horizontal plate 14 to be shifted to place, the pins 30 and 31 in a position to block the coin channels 24" and 25". Either a dime D is dropped in the recessed channel 24, or two nickels N are dropped in recessed channel 25 as illustrated in FIGURE 5. The coin operating member 8 is depressed by pressing on the outer end 8''' to the position as shown in FIGURE 10. When the member 8 is depressed, if it is a dime, the dime depresses the pin 22, which extends into the channel 24. The pin being carried on the plate 10 depresses this plate which places pins 20 and 23 in a position to block the channel portion 24' and 25' leading to the coin deposit box. At the same time pin 12 which is fixed to the coin operating member 8 and positioned substantially opposite pin 81 on the opposite side of the coin operating member 8, moves against the handle 50, rotating the arm 48 to set the timing device. When the pin moves the handle 50 to the position shown in FIGURE 9, this allows the pin 89 carried by plate 10 to follow the handle member 50, the plate 10 being moved downwardly by the positive engagement with the dime against the pin 22. Also as the plate 10 is moved downwardly the pin 38 (see FIG. 7) contacts the upper edge of the plate member 35. This movement of the plate 35 also moves the pin 39 and disengages the pin from the notch 44 of the bar 41 and allows the bar 41 to be moved downwardly with the coin operating member 8. If for example, if there were no coins in the coin channels to move the plate 10 and likewise to move the pin 38 against the member 35, the locking bar would prevent the coin control member 8 from being depressed. The member 35 when operated also positively moves the horizontal plate 14 to a position where the channels 24" and 25" are blocked and the member 35 is held in this position by the spring 69 until the sound transmitting unit is placed upon the support 67 which moves the arm 65 to its full line position (FIG. 2) whicd in turn moves the pin 40 to the left in FIGURE 7, urges the member 35 to return to its full line position and ready for another cycle of operation.

If two nickels N are used instead of the dime D the portion 8" of the coin operating member contacts the upper nickel $N^1$ which in turn presses nickel $N^2$ against the pin 21 which operates the plate 10 in the same manner as has been described for the dime D.

After the timer has been set, the member 8 is returned to its normal position by the spring 80, but the plate 10 remains in its downward position, until the timer releases the arm 48. When the arm 48 is released the handle 50 carried thereby contacts the pin 89 which is attached to the plate 10 moving the plate upwardly together with pins 20 and 23 releasing the coins, either a dime, or the two nickels as the case may be, to allow them to move down the recess channel 24' and 25' into the coin box.

The attachment is very desirable for use in places which employ a considerable number of personnel and in places where the public has access to private telephones which are constantly being used by unauthorized persons, as this becomes very expensive after the allotted number of calls have been made. With the present device all calls made must be paid for and at the present rate the attachment will actually make money for the installer on the present rate of telephone charges by the telephone company.

There is no alteration of the present wall telephone to install the attachment or of any parts of the telephone, the only requirements being the attachment of the clip 64 to the dial. Further there is no interference with incoming calls.

While a specific form of the invention has been illustrated and described it is not intended as a limitation and, therefore, the scope of the invention is best defined by the appended claims.

I claim:

1. A coin attachment for a wall type dial telephone set, the set having a hand piece, a switch hook supporting said hand piece in a vertical position, the attachment adapted to be mounted vertically adjacent the said set and comprising, a movable arm the outer end of which is operatable adjacent and in close proximity of the dial, and adapted to engage means on the dial when the dial is in its normal position for locking the same, vertical coin slots extending downwardly into the attachment adapted to accommodate predetermined size coins and means operatable by said coins for detaching the said locking means from the dial, a manually operated means extending upwardly from the top of the said attachment for moving the coins through at least a part of the coin slots, a second arm operatable by the switch hook for said hand piece, said second arm operating a coin control means for ejecting the coins through an opening in the attachment for returning the same to the user, a timer for operating the first arm for locking the said dial.

2. A device as claimed in claim 1 wherein the said arm extends outwardly from the side of the attachment in the vicinity of the hook switch.

3. A device as claimed in claim 1 wherein said telephone dial comprises a rotatable portion having a stop member position thereon, said first arm engaging said stop member when in locking position.

References Cited in the file of this patent

UNITED STATES PATENTS

| | | |
|---|---|---|
| 985,616 | Meade | Feb. 28, 1911 |
| 1,362,464 | Baum et al. | Dec. 14, 1920 |
| 1,524,703 | Fogelsonger | Feb. 3, 1925 |
| 2,309,572 | Bruck | Jan. 26, 1943 |
| 2,655,244 | Stoner et al. | Dec. 20, 1948 |
| 2,732,430 | Hare | Jan. 24, 1956 |

FOREIGN PATENTS

| | | |
|---|---|---|
| 312,807 | Great Britain | Jan. 24, 1956 |